(12) United States Patent
Atkinson et al.

(10) Patent No.: US 7,163,028 B1
(45) Date of Patent: Jan. 16, 2007

(54) MULTIPURPOSE PLUMBING TOOL

(76) Inventors: Manuel Diaz Atkinson, 5513 Naaman Forest Blvd., #1003, Garland, TX (US) 75044; Mark Abraham, 791 Main St., Chatham, MA (US) 02633

( * ) Notice: Subject to any disclaimer, the term of this patent is extended or adjusted under 35 U.S.C. 154(b) by 0 days.

(21) Appl. No.: 11/134,934

(22) Filed: May 23, 2005

Related U.S. Application Data

(60) Provisional application No. 60/574,557, filed on May 26, 2004.

(51) Int. Cl.
*F16L 55/10* (2006.01)

(52) U.S. Cl. ............... 138/89; 138/90; 138/96 T; 138/109; 285/8; 285/910

(58) Field of Classification Search ............... 138/89, 138/96 T, 90, 91, 109, 94.3; 285/8, 220, 285/910, 901, 338
See application file for complete search history.

(56) References Cited

U.S. PATENT DOCUMENTS

| | | | | |
|---|---|---|---|---|
| 3,164,361 | A | * | 1/1965 | Pruett ........................ 251/149.6 |
| 3,606,399 | A | * | 9/1971 | Zahuranec ................... 285/220 |
| 4,005,735 | A | * | 2/1977 | Miyamoto ................. 138/96 R |
| 4,688,830 | A | * | 8/1987 | Meisinger et al. ........... 285/100 |
| 4,716,938 | A | * | 1/1988 | Weh et al. ..................... 138/93 |
| 5,104,151 | A | * | 4/1992 | Adams ......................... 285/16 |
| 6,276,399 | B1 | * | 8/2001 | Fox ............................ 138/109 |

* cited by examiner

*Primary Examiner*—Patrick Brinson
(74) *Attorney, Agent, or Firm*—Herbert L. Bello

(57) ABSTRACT

A multipurpose plumbing tool has a body at one end, a head at an opposite end and an intermediate neck portion connecting the body and head. The marginal end portion of the body is cut back to form a reduced section, a shoulder being formed at the junction of the reduced section and a non-reduced section of the body. The reduced section is internally and externally threaded. An inwardly tapered seat for an O-ring is formed in the shoulder. An O-ring positioned in the tapered seat is compressed and contained within the tapered seat to provide a water tight seal when the externally threaded end is threaded into a female fitting. The free end of the head is formed with an internally threaded socket. A washer seated at the bottom of the socket provides a water tight seal when the socket is screwed onto a male plumbing fitting.

19 Claims, 5 Drawing Sheets

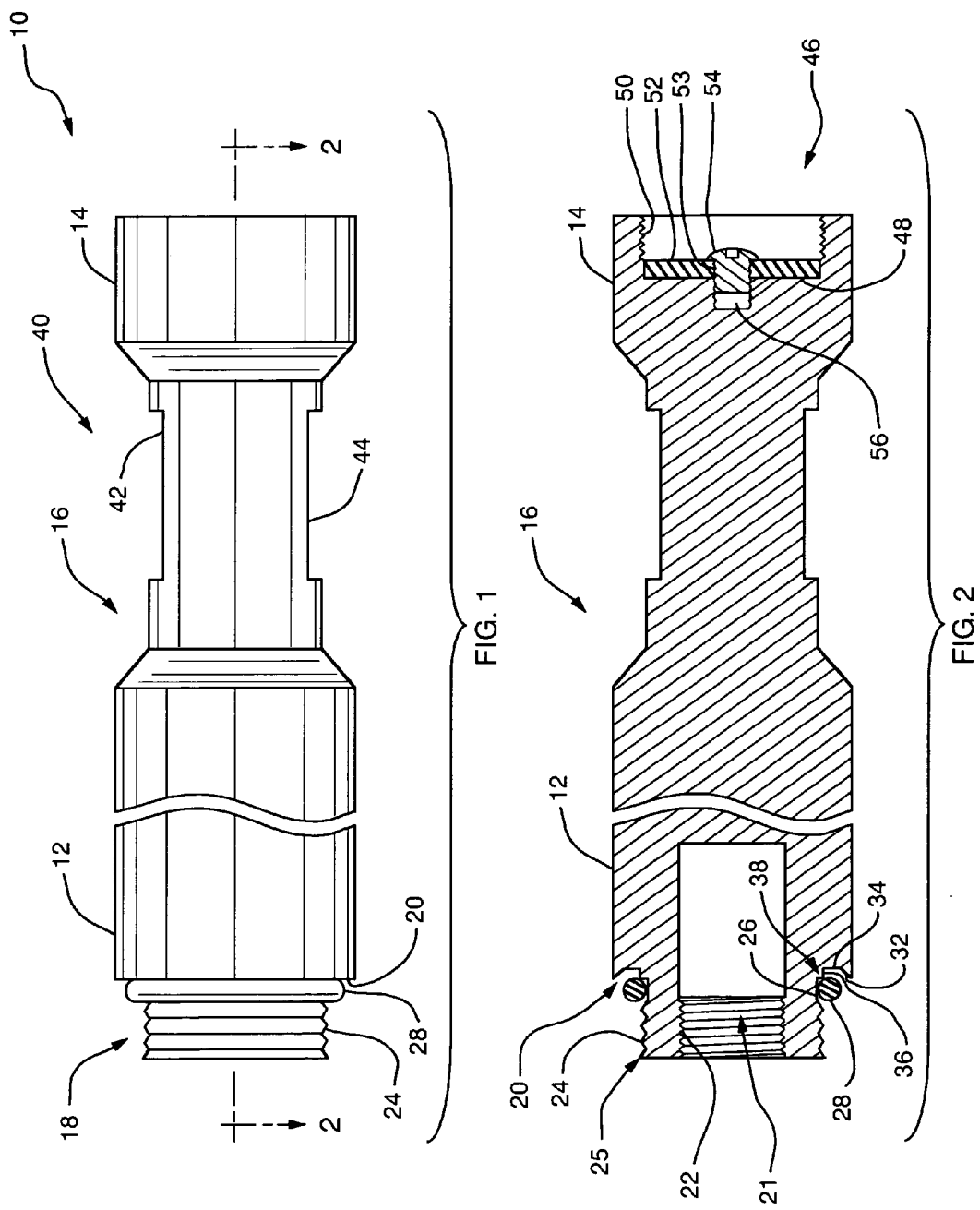

US 7,163,028 B1

MULTIPURPOSE PLUMBING TOOL

CROSS-REFERENCE TO RELATED APPLICATIONS

Benefit is claimed under Title 35, United States Code, § 119 (e) of U.S. Provisional Application No. 60/574,557, filed May 26, 2004.

BACKGROUND OF THE INVENTION

1. Field of Invention

The present invention relates to plumbing tools, and more particularly, to a multipurpose plumbing tool for use in testing the integrity of water systems and for facilitating installation of plumbing components.

2. Description of the Prior Art

Generally, when testing for leaks in water systems, it is necessary for the plumber to plug and cap off pipes and fittings before pressurizing the system. For example, a plug must be installed on a drop ear elbow and a nipple and cap must be installed on water supply stops. It is time consuming and labor intensive for a plumber to install the plugs, nipples and caps on pipes and fittings when testing for leaks in water systems. Oftentimes, due to limited space, it is difficult for a plumber to tighten a compression valve that is connected between a plumbing line and a supply line to a faucet because two pliers or two wrenches are needed to secure the compression valve in place. Also, when a plumber is installing or removing a shower arm, a screw driver may be inserted into the shower arm as a leverage device for tightening or loosening the shower arm. A screw driver may damage the threads on the shower arm or make the shower arm out of round. A need has arisen for a relatively simple multipurpose plumbing tool that does not suffer from the heretofore mentioned limitations and disadvantages.

SUMMARY OF THE INVENTION

An object of the present invention is to overcome the aforementioned limitations and disadvantages.

Another object of the present invention is to provide a multipurpose plumbing tool that is especially adapted to be used for temporarily plugging and capping plumbing lines and plumbing fixtures.

A further object of the present invention is to provide a multipurpose plumbing tool that facilitates the installation and removal of plumbing components.

A multipurpose plumbing tool embodying the invention has a body at one end, a head at an opposite end and an intermediate neck portion connecting the body and head. The marginal end portion of the body is cut back to form a reduced section, a shoulder being formed at the junction of the reduced section and a non-reduced section of the body. The reduced section is internally and externally threaded. An inwardly tapered seat in the form of a substantially V-shaped cavity is formed in the shoulder. A compressible O-ring positioned in the V-shaped cavity is compressed when the external threads of the tool are threaded into a female fitting. The V-shaped cavity holds the O-ring within the V-shaped cavity and prevents the O-ring from spreading outwardly when compressed, thereby providing a water tight seal. The intermediate portion is provided with a gripping section for turning the tool. The free end of the head is formed with an internally threaded socket. A washer seated at the bottom of the socket provides a water tight seal when the socket is screwed onto a male plumbing fitting.

Other general and specific objects, features and advantages of the invention will in part be obvious and will in part appear hereinafter.

BRIEF DESCRIPTION OF THE DRAWINGS

An understanding of the nature and objects of the present invention will become more readily apparent upon consideration of the following detailed description taken in connection with the accompanying drawings, wherein:

FIG. 1 is side view of a multipurpose plumbing tool embodying the invention;

FIG. 2 is a sectional view of the multipurpose plumbing tool taken along the lines 2—2 in of FIG. 1;

DETAILED DESCRIPTION OF THE PREFERRED EMBODIMENTS

Figure 3:
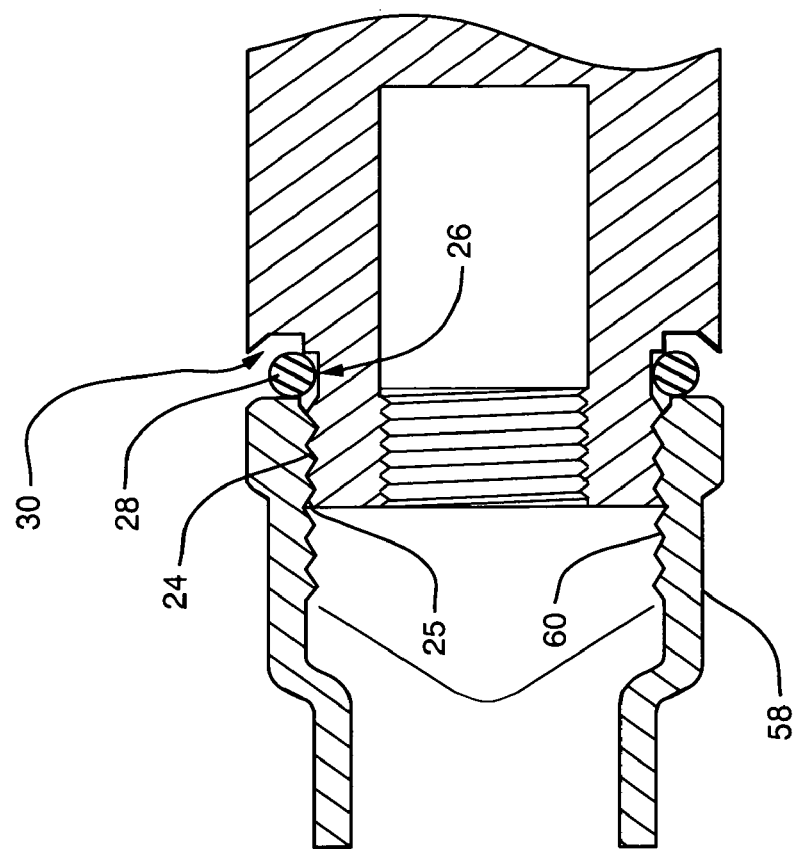
FIG. 3 is a side elevation in section showing external threads of the multipurpose plumbing tool being threaded into a female fitting, an O-ring positioned in a holding station in the tool.

Referring now to the drawings, particularly FIGS. 1 and 2, there is shown a multipurpose plumbing tool 10 embodying the invention that is especially adapted to be used for temporarily plugging and capping plumbing lines and plumbing fittings when testing water systems for leaks. Also, tool 10 is used to facilitate installation and removal of plumbing components. For example, as hereinafter described, tool 10 can be used to facilitate installation of a compression valve that is connected between a plumbing line and a supply line for a faucet, such as a bathroom sink faucet.

In the preferred embodiment, tool 10 is a one-piece cylindrical member having a body 12 at one end, a head 14 at an opposite end and a neck 16 intermediate the body and head. A free end of the body 12 is cut back to form a reduced section 18, a shoulder 20 being formed at the junction of the reduced section and a non-reduced section 19 of the body. The reduced section 18 is provided with a cavity 21 having internal threads 22, the exterior surface of the reduced section having external threads 24. In the illustrated embodiment, external threads 24 are ½ inch straight male threads with a fifteen pitch. The threads at the free end of reduced section 18 are undersized as shown by reference character 25. Internal threads 22 are ⅜ inch female threads.

A holding station 26 for a compressible sealing member 28, for example an O-ring, is formed in reduced section 18 adjacent shoulder 20. A tapered seat or sealing station 30 in the form of a substantially V-shaped cavity is formed in body 12 at shoulder 20. Substantially V-shaped cavity 30 has an inwardly sloping sidewall 32, a flat bottom surface 34 and a flat interior sidewall 36 that forms a step 38 with holding station 26.

In the illustrated embodiment, the diameter of neck 16 is less than the diameter of body 12 and head 14. Preferably, neck 16 is cut away to form a grip 40 having opposed flat sides 42 and 44 that are configured to be engaged by a turning tool (not shown), for example, a pair of pliers or a wrench. In an alternate embodiment, neck 16 is provided with a knurled gripping surface.

Head 14 is formed with an internally thread socket 46 having a seat 48 at the bottom of the socket. Socket 46 is provided with ½ inch straight female threads 50. A washer 52, for example a bibb washer with a central hole 53, is seated in seat 48. A screw 54 is threaded into a tapped hole 56 in head 14 for securing washer 52 in socket 46. In an alternate embodiment, washer 52 is a solid washer that is held in place by threads 50.

In FIG. 3, external threads 24 of tool 10 are being threaded into a female fitting 58 having ½ inch tapered female iron pipe threads 60 with a standard fourteen pitch. It is to be noted that the ½ inch straight male threads 24 fit loosely on female tapered threads 60. Undersized threads at 25 provide compatibility for different tolerances in female iron pipe threads. O-ring 28 is seated in holding station 26 waiting to be engaged by female fitting 58 as tool 10 is being threaded into the female fitting.

Figure 4:
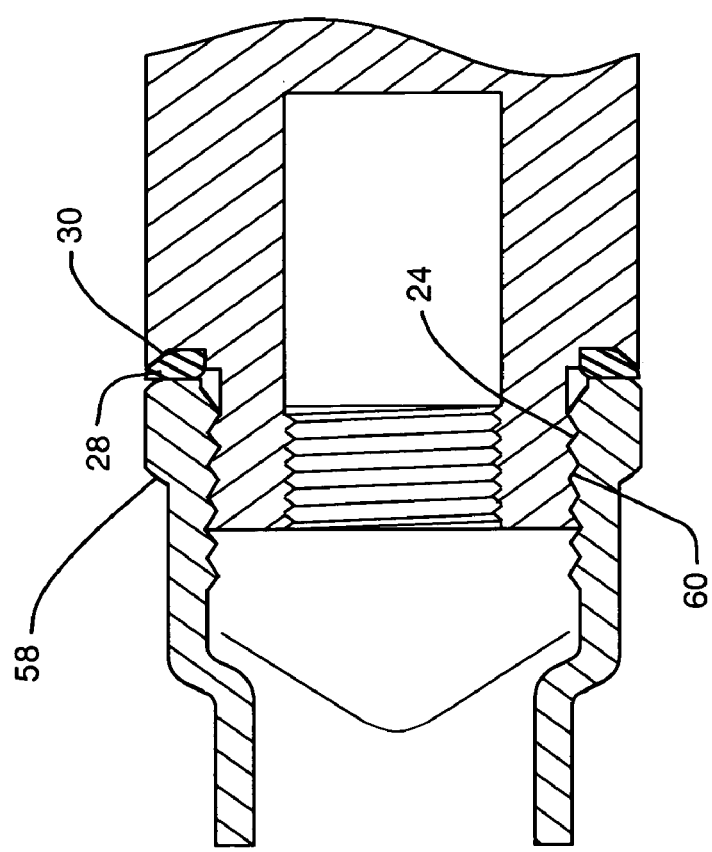
FIG. 4 is a side elevation in section showing the body of the multipurpose plumbing tool with the O-ring moved into the V-shaped cavity and compressed; the O-ring constrained within the substantially V-shaped cavity.

Referring now to FIG. 4, it will be seen that threads 24 have been turned into female fitting 58. The fifteen pitch threads 24 and the fourteen pitch threads 60 have moved into a binding relationship, thus making a stable connection. Without a difference in the pitch of threads 24 and threads 60, the connection between tool 10 and female fitting 58 would not be stable. As threads 24 are turned into female fitting 58, O-ring 28 is pushed over step 38 into V-shaped cavity 30. As threads 24 are turned further into female fitting 58, O-ring 28 is compressed in V-shaped cavity 30. The configuration of V-shaped cavity 30 is such that O-ring 28 is constrained within the cavity. A water and air tight seal is formed by the compressed O-ring 28 that is disposed between tool 10 tapered seat 30 and female fitting 58.

Figure 5:
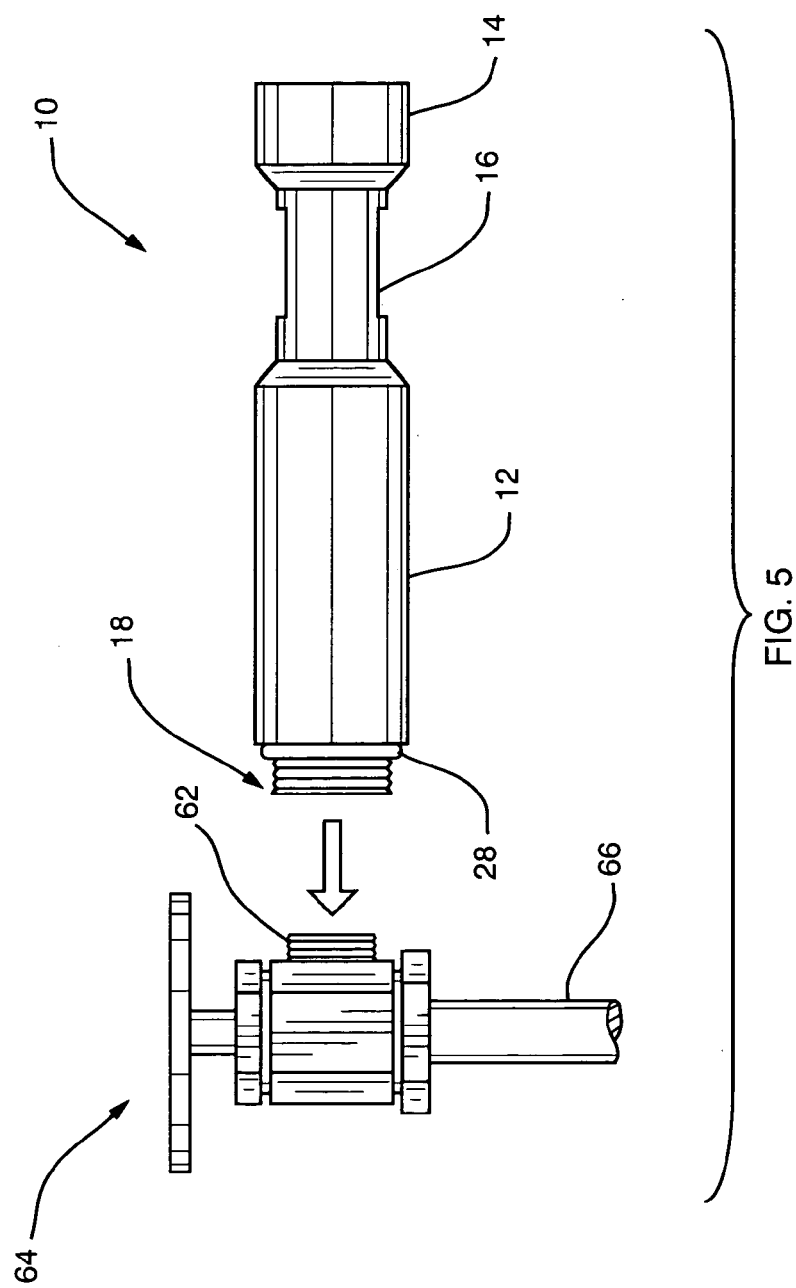
FIG. 5 is a perspective view of the multipurpose plumbing tool of FIG. 1 being used with a compression valve.

Internal threads 22 are compatible with the ⅜ inch male threads 62 of a compression valve 64 shown in FIG. 5. Compression valve 64 is positioned between a feeder line 66 and a supply line (not shown) that is connected to a faucet, for example a bathroom faucet. When tool 10 is threaded onto compression valve 64, a plumber can easily hold the compression valve steady for connection with feeder line 66 by grasping tool 10.

Figure 6:
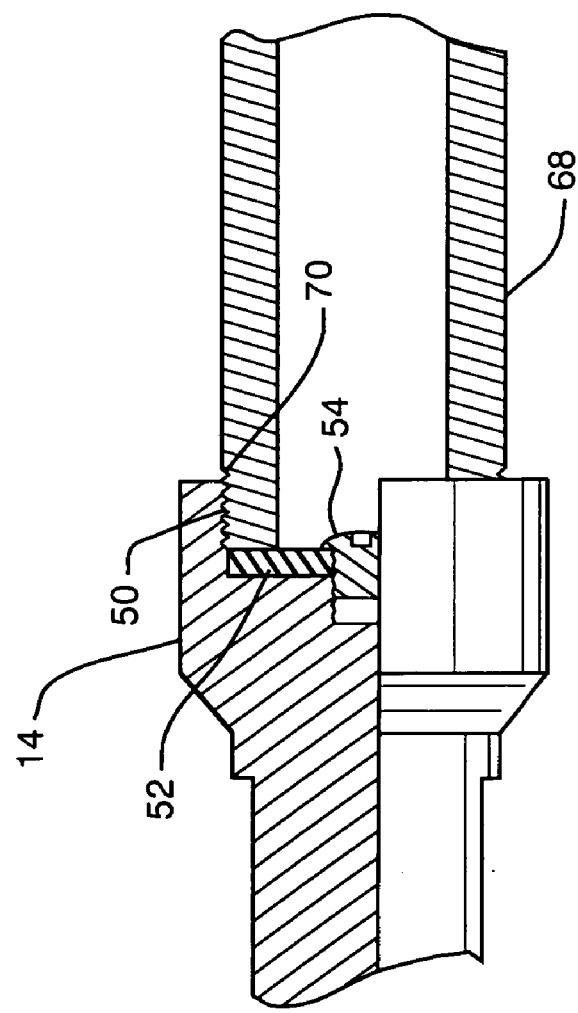
FIG. 6 is a perspective view, partly in section, of the multipurpose plumbing tool of FIG. 1 being used to cap a shower arm.

Referring to FIG. 6, tool 10 is used to seal a fitting having ½ inch male iron pipe threads, for example a shower arm 68. Threads 50 are turned onto threads 70 of shower arm 68 until the end of the shower arm makes a seal with washer 52. Once shower arm 68 is sealed, a plumber can turn on the water to test the integrity of the shower line for leaks. In a similar manner, a plumber can plug or cap off a number of fittings having ½ inch male iron pipe threads using tool 10 for testing the water system for leaks.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A multipurpose plumbing tool comprising:
   (a) a body having first and second ends, said first end having a narrowed section that is externally threaded, a shoulder formed at an innermost end of said narrowed section, a first seat formed at said innermost end of said narrowed section and in said shoulder;
   (b) an intermediate neck portion having first and second ends, said first end of said neck portion connected to said second end of said body;
   (c) a head having first and second ends, said second end of said neck portion connected to said first end of said head, an internally threaded socket provided at said second end of said head, a second seat formed at the inner end of said socket;
   (d) a first sealing member in said first seat; and
   (e) a second sealing member in said second seat,
      wherein there is no fluid flow through the tool.

2. The multipurpose plumbing tool as claimed in claim 1 wherein said first sealing member is a compressible sealing member and wherein said first seat includes a cavity formed in said shoulder, said cavity configured to contain said first sealing member within said cavity when said first sealing member is compressed.

3. The multipurpose plumbing tool as claimed in claim 2 wherein said first sealing member is an O-ring, said O-ring contained within said cavity of said first sealing member when compressed.

4. The multipurpose plumbing tool as claimed in claim 1 wherein said first sealing member is an O-ring and wherein said first seat is formed with a holding station and a sealing station, said sealing station being a substantially V-shaped cavity, said O-ring compressed when said external threads are threaded into a female fitting, said V-shaped cavity configured to constrain said O-ring within said cavity when said O-ring is compressed.

5. The multipurpose plumbing tool as claimed in claim 1 wherein said second sealing member is a bibb washer.

6. A multipurpose plumbing tool comprising:
   (a) a body having first and second ends, said body having an internal cavity that is opened at said first end, said first end having a narrowed section that is internally and externally threaded, a shoulder formed at an innermost end of said narrowed section, a first seat formed at said innermost end of said narrowed section and in said shoulder;
   (b) an intermediate neck portion having first and second ends, said first end of said neck portion connected to said second end of said body;
   (c) a head having first and second ends, said second end of said neck portion connected to said first end of said head, an internally threaded socket provided at said second end of said head, a second seat formed at the inner end of said socket;
   (d) a first sealing member in said first seat; and
   (e) a second sealing member in said second seat.

7. The multipurpose plumbing tool as claimed in claim 6 wherein said first sealing member is a compressible sealing member and wherein said first seat is a cavity that is configured to contain said first sealing member within said cavity when said first sealing member is compressed.

8. The multipurpose plumbing tool as claimed in claim 7 wherein said first sealing member is an O-ring, said O-ring contained within said cavity of said first sealing member when compressed.

9. The multipurpose plumbing tool as claimed in claim 6 wherein said first sealing member is an O-ring and wherein said first seat is formed with a holding station and a sealing station, said sealing station being a substantially V-shaped cavity, said O-ring compressed when said external threads are threaded into a female fitting, said V-shaped cavity configured to constrain said O-ring within said cavity when said O-ring is compressed.

10. The multipurpose plumbing tool as claimed in claim 6 wherein said second sealing member is bibb washer, said bibb washer providing a seal when said internally threaded socket is threaded onto a male thread of compatible male thread size.

11. The multipurpose plumbing tool as claimed in claim 6 said wherein said external threads at an outermost end of said narrowed section are undersized compared to the remainder of said external threads of said narrowed section.

12. A multipurpose plumbing tool comprising:
(a) a body having first and second ends, said body having an internal cavity that is opened at said first end, said first end having a narrowed section with external threads, internal threads provided at said opened end of said internal cavity, a shoulder formed at an innermost end of said narrowed section, a first seat formed at said innermost end of said narrowed section and in said shoulder;
(b) an intermediate neck portion having first and second ends, an intermediate section of said neck portion formed with a grip, said first end of said neck portion connected to said second end of said body;
(c) a head having first and second ends, said second end of said neck portion connected to said first end of said head, an internally threaded socket provided at said second end of said head, a seat formed at the inner end of said socket;
(d) an O-ring seated in said first seat; and
(e) a washer seated in said second seat.

13. The multipurpose plumbing tool as claimed in claim 12 wherein said external threads at an outermost end of said narrowed section are undersized compared to the remainder of said external threads at said narrowed section.

14. The multipurpose plumbing tool as claimed in claim 12 wherein said first seat includes a holding station and a sealing station, said O-ring initially positioned in said holding station, said O-ring positioned in said holding station being urged into and held in said sealing station when said externally threaded narrowed section is threaded into a female fitting having a compatible female thread size.

15. The multipurpose plumbing tool as claimed in claim 12 wherein said second seal is a bibb washer, said bibb washer providing a seal when said internally threaded socket is threaded onto a male thread of compatible male thread size.

16. The multipurpose plumbing tool as claimed in claim 12 wherein said grip is configured to be engaged by a turning tool.

17. The multipurpose plumbing tool as claimed in claim 16 wherein said grip is a gripping surface having opposed flat surfaces that are configured to be engaged by a turning tool.

18. The multipurpose plumbing tool as claimed in claim 12 wherein said first seat is formed with a holding station and a sealing station, said sealing station being a substantially V-shaped cavity, said O-ring compressed when said external threads are threaded into a female fitting, said V-shaped cavity configured to constrain said O-ring within said V-shaped cavity when said O-ring is compressed.

19. The multipurpose plumbing tool according to claim 1, the first end of the body having a cavity with internal threads.

* * * * *